United States Patent
Bedingfield

(10) Patent No.: US 9,306,377 B1
(45) Date of Patent: Apr. 5, 2016

(54) CABLE RODDING ASSEMBLY

(71) Applicant: MILLIKEN & COMPANY, Spartanburg, SC (US)

(72) Inventor: Steven L. Bedingfield, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 174 days.

(21) Appl. No.: 14/109,102

(22) Filed: Dec. 17, 2013

(51) Int. Cl.
*H02G 1/08* (2006.01)
*H02G 1/04* (2006.01)

(52) U.S. Cl.
CPC .............. *H02G 1/083* (2013.01); *H02G 1/08* (2013.01); *H02G 1/04* (2013.01); *H02G 1/085* (2013.01)

(58) Field of Classification Search
CPC ........... H02G 1/083; H02G 1/08; H02G 1/04; H02G 1/085; B60M 1/28; B66F 11/046
USPC .......... 254/134.3 R, 134.3 FR, 134.4; 29/255
See application file for complete search history.

(56) References Cited

U.S. PATENT DOCUMENTS

| | | | | |
|---|---|---|---|---|
| 1,995,473 | A * | 3/1935 | Giachetti ............... | B60K 11/06 254/134.3 R |
| 2,515,953 | A * | 7/1950 | Dufresne ............... | H02G 1/088 104/138.2 |
| 2,518,330 | A * | 8/1950 | Jasper ..................... | B08B 9/049 104/138.2 |
| 4,030,702 | A | 6/1977 | Ware et al. ................. | 254/134.4 |
| 4,201,326 | A * | 5/1980 | Connell ............. | B23K 37/0531 219/160 |
| 4,202,531 | A | 5/1980 | Hamrick ..................... | 254/134.4 |
| 4,337,390 | A | 6/1982 | Best ............... | 219/532 |
| 6,386,421 | B1 * | 5/2002 | Anderson et al. ............. | 228/44.5 |
| 6,547,228 | B1 * | 4/2003 | Schmalz ............... | B25B 11/007 269/21 |
| 7,201,055 | B1 * | 4/2007 | Bagley ................... | G01R 31/34 376/249 |
| 7,216,846 | B2 * | 5/2007 | Crawford ............... | H02G 1/081 254/134.3 FT |
| 7,780,065 | B2 * | 8/2010 | Vermaat ........................ | 228/212 |
| 9,019,364 | B2 * | 4/2015 | Brignac ............... | G01N 21/954 348/84 |
| 2006/0201273 | A1 * | 9/2006 | Beckley ............... | B60H 1/3407 74/473.3 |
| 2008/0073631 | A1 * | 3/2008 | Huo ....................... | 254/134.3 FT |
| 2012/0280439 | A1 * | 11/2012 | Gonzalez ............ | C22B 15/0047 266/200 |
| 2014/0124717 | A1 * | 5/2014 | Maltby ................... | H02G 1/083 254/134.3 R |

FOREIGN PATENT DOCUMENTS

| | | | |
|---|---|---|---|
| DE | 10221550 | * | 5/2002 |
| JP | 03049514 | * | 7/1989 |
| JP | 03049514 A | * | 7/1989 |
| JP | 02223317 | * | 9/1990 |
| JP | 03049514 | * | 3/1991 |
| WO | WO2010/061341 A2 | * | 6/2010 |

* cited by examiner

*Primary Examiner* — Monica Carter
*Assistant Examiner* — Mahdi H Nejad
(74) *Attorney, Agent, or Firm* — Cheryl J. Brickey

(57) ABSTRACT

A rodding assembly containing a body, a first wing projecting outward from a first side surface of the body and extending at least partially along the length of the body, a second wing projecting outward from the second side surface of the body and extending at least partially along the length of the body, at least one spring loaded mechanism attached to an upper surface of the body, and a rod assembly attached to a rear surface of the body.

5 Claims, 4 Drawing Sheets

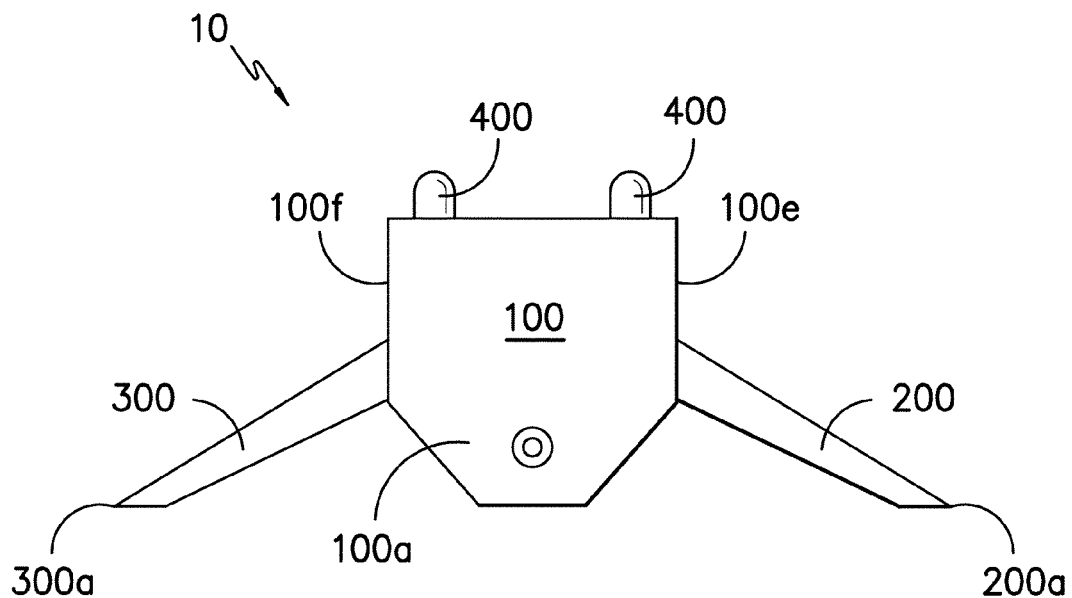
FIG. -1-
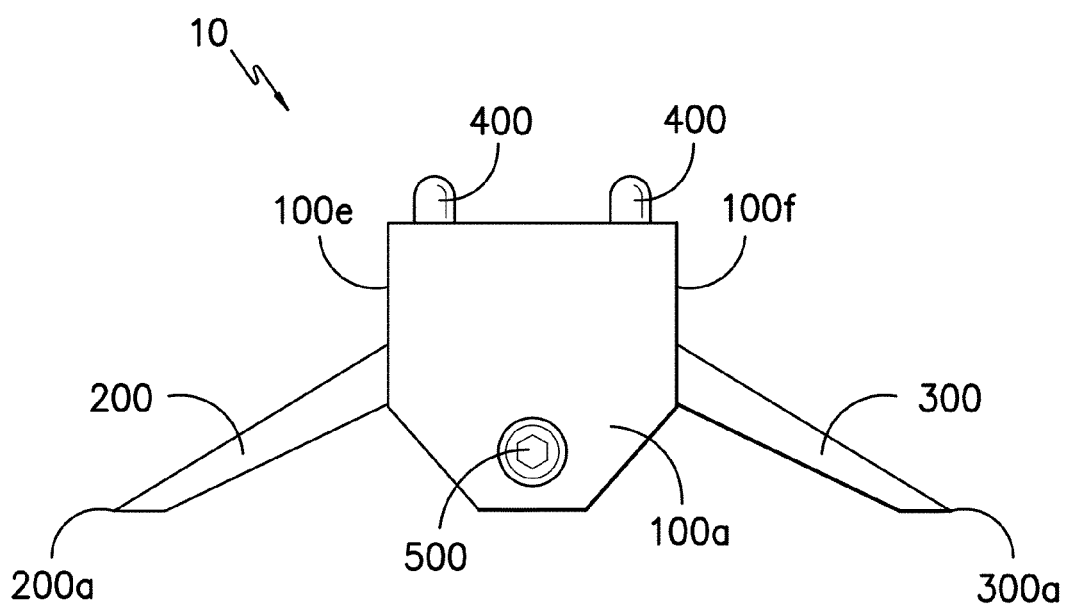
FIG. -2-

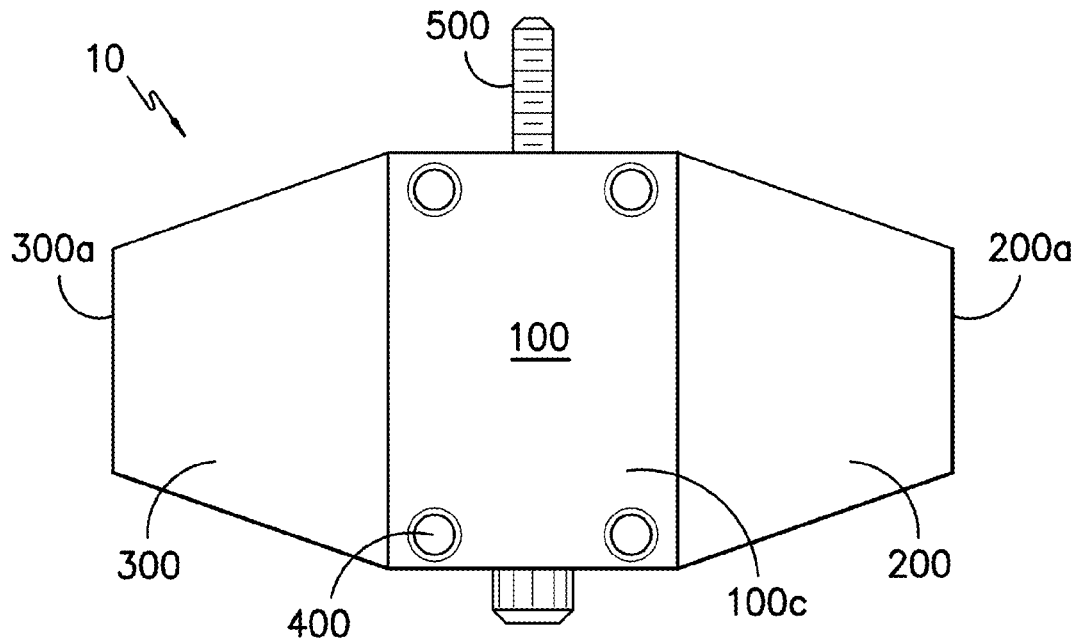
FIG. -3-
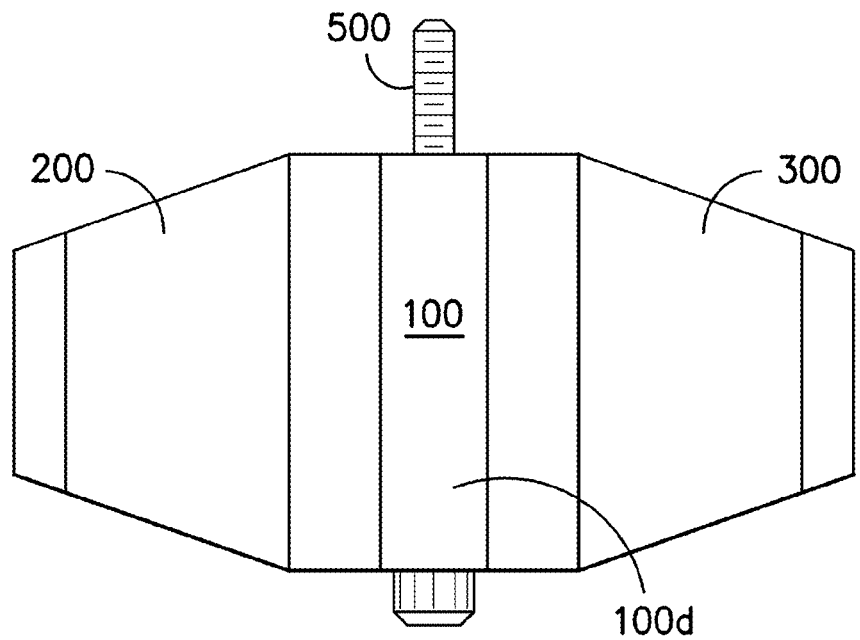
FIG. -4-

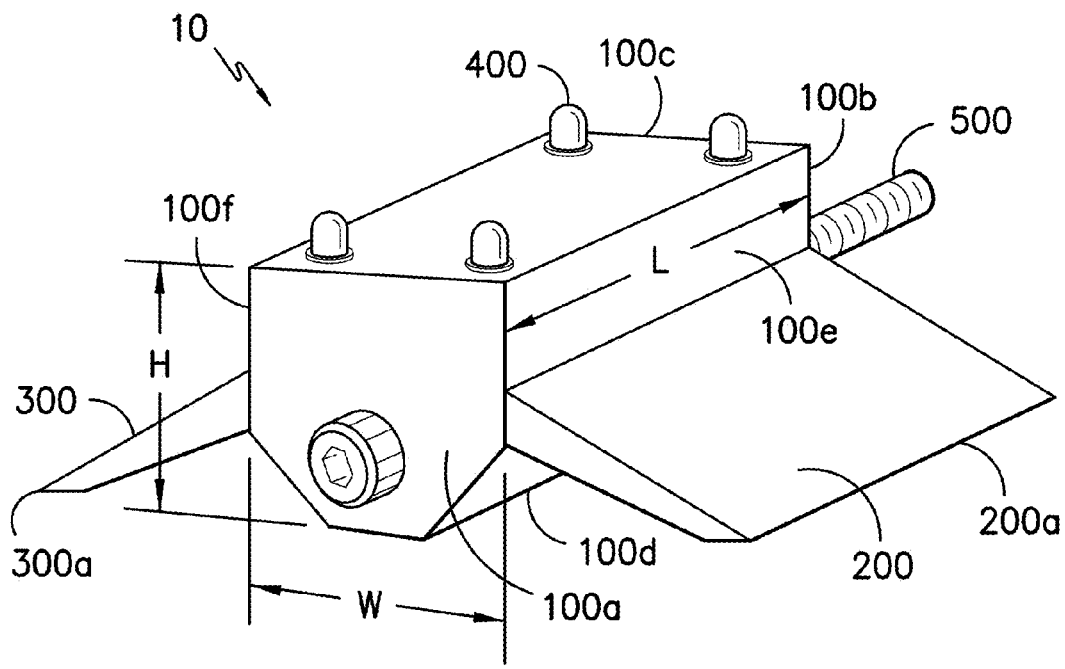
FIG. -5-
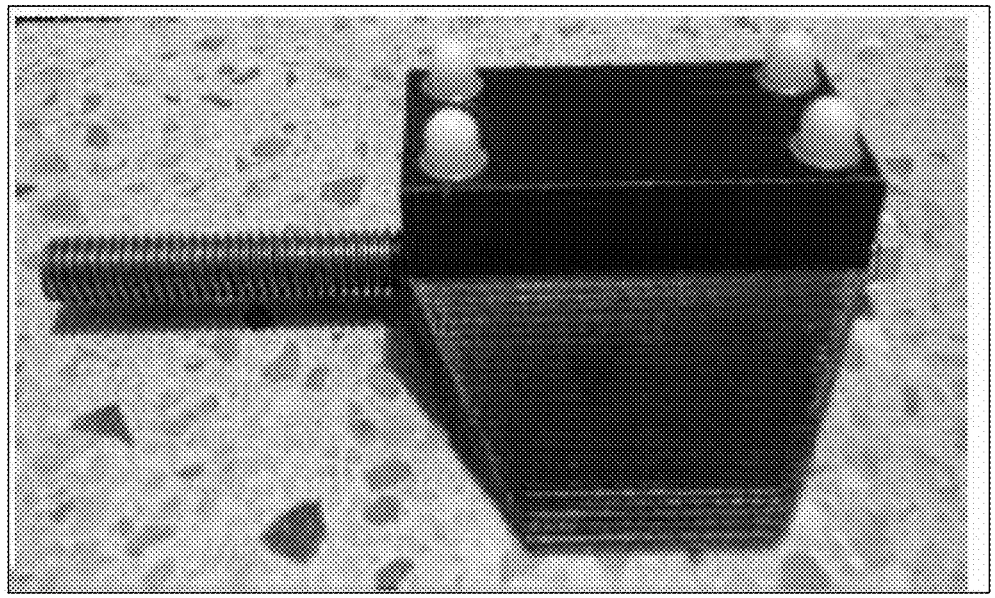
FIG. -6-

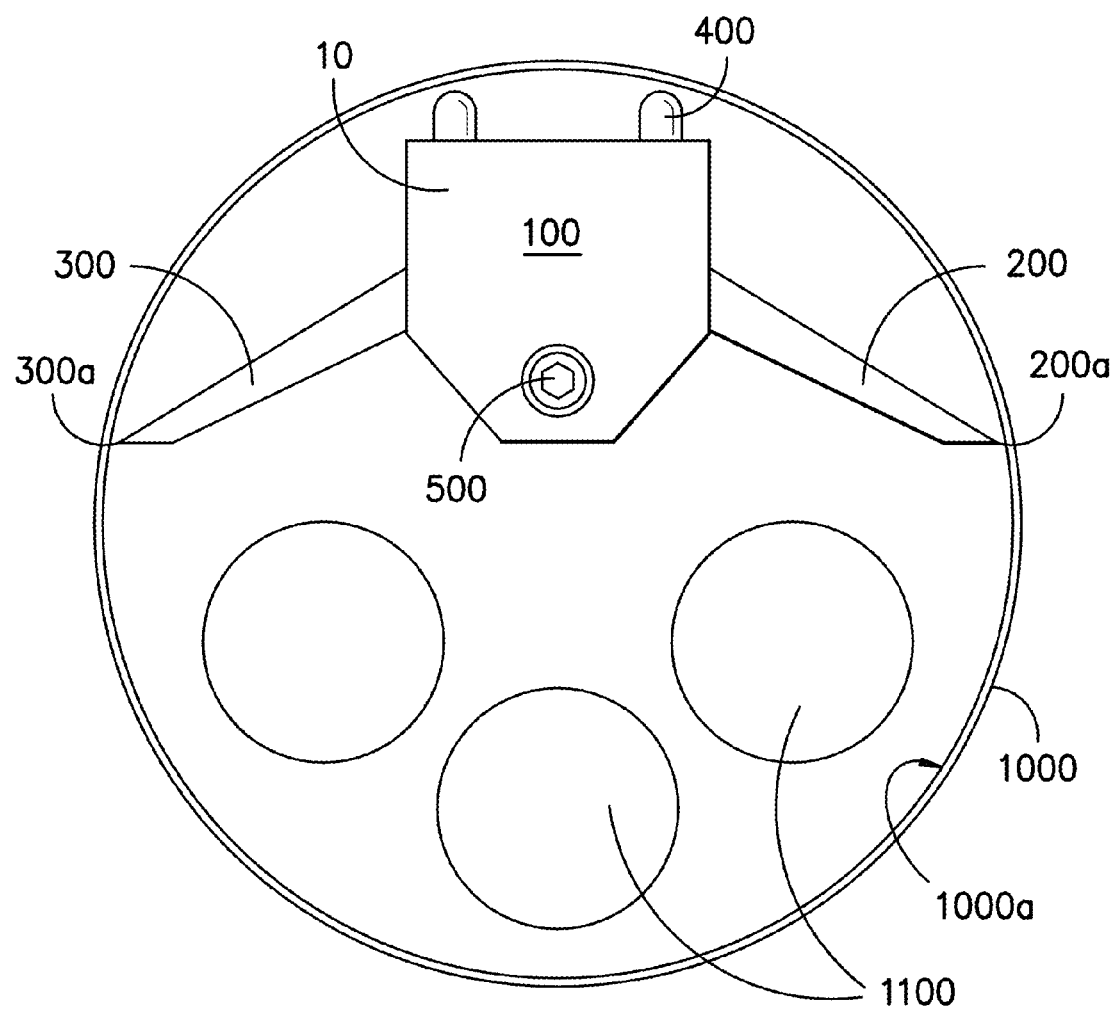
FIG. -7-

# CABLE RODDING ASSEMBLY

FIELD OF THE INVENTION

The present invention generally relates to rodding assemblies.

BACKGROUND

Cable, such as fiber optic communication cable, is often provided underground in conduits. When a conduit is in place, it may be subsequently desired to run additional communications cable in the empty space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables.

Thus there is a need for a rodding system that can move through a conduit with less twisting and threading through existing cables.

BRIEF SUMMARY

A rodding assembly containing a body, a first wing projecting outward from a first side surface of the body and extending at least partially along the length of the body, a second wing projecting outward from the second side surface of the body and extending at least partially along the length of the body, at least one spring loaded mechanism attached to an upper surface of the body, and a rod assembly attached to a rear surface of the body. Methods of using the rodding assembly are also disclosed.

BRIEF DESCRIPTION OF THE DRAWINGS

FIG. 1 is a prospective front view of one embodiment of a rodding assembly.

FIG. 2 is a prospective rear view of one embodiment of the rodding assembly.

FIG. 3 is a prospective top view of one embodiment of the rodding assembly.

FIG. 4 is a prospective bottom view of one embodiment of the rodding assembly.

FIG. 5 is a prospective view of one embodiment of the rodding assembly.

FIG. 6 is a photograph of one embodiment of the rodding assembly.

FIG. 7 is an illustration of one embodiment of the rodding assembly in a conduit with existing cables.

DETAILED DESCRIPTION

Referring to the Figures, FIGS. 1-5 show different views of one embodiment of a rodding assembly 10. FIG. 1 is a front view, FIG. 2 is a rear view, FIG. 3 is a top view, FIG. 4 is a bottom view, and FIG. 5 is a prospective view. The rodding assembly 10 contains a body 100, a first wing 200, a second wing 300, at least one spring loaded mechanism 400, and a rod mount 500. FIG. 6 is a photograph of one embodiment of the rodding assembly 10.

Referring now to the front view, FIG. 1, the body 100 has a width, length, and height and also has an upper surface 100c, a lower surface 100d, a first side surface 100e, a second side surface 100f, a front surface 100a, and a rear surface 100b. FIG. 5 illustrates a prospective view of the rodding assembly 10 showing all of the body 100 surfaces (100a, 100b, 100c, 100d, 100e, 100f) as well as the length (L), height (H), and width (W) of the body.

The body may be formed from any suitable material, preferably one that is light weight, low friction, and easily machined. In one embodiment, the body is made from a thermoplastic such as acrylonitrile butadiene styrene (ABS). The body 100 provides stability to the rodding assembly and most of the other components are attached onto (or into) the body 100.

The rodding assembly 10 preferably contains at least two wings, a first wing 200 and a second wing 300. The wings 200, 300 may be attached to the body in any suitable manner such as adhesive, metal fasteners such as screws or may be integral with the body. Integral with the body means that the wings 200, 300 and the body 100 are molded or otherwise machined or formed from the same material at the same time such that the wings 200, 300 are part of one whole. Preferably, the wings 200, 300 are integral to the body 100, as being integral provides greater strength and less breakage to the wings 200, 300 where they meet the body 100.

The first wing 200 projects outward from the first side 100e of the body 100 and extends at least partially along the length L of the body. The second wing 300 projects outward from the second side 100f of the body 100 and extends at least partially along the length of the body. In one embodiment, the wings 200, 300 project from the body at approximately the center of the height H of the body 100. In another embodiment, the wings 200, 300 project from the body at a plane between the center of the height of the body 100 and the lower surface 100d of the body 100. In one embodiment, the wings 200, 300 do not extend such that the edges 200a, 300a are lower than the lower surface 100d of the body 100. In another embodiment, the wings 200, 300 extend such that the edges 200a, 300a are lower than the lower surface 100d of the body 100. The winged design helps prevent cables from crossing and thus lowers the chance of the rodding assembly and/or rob from become wrapped or tangled with an existing cable in a conduit. Additionally, the wings are important as the edges 200a, 300a of the wing 200, 300 touch the inner surface of the conduit and not the body 100.

In one embodiment, the wings 200, 300 are tapered such that the thickness of the wing is the greatest at the side surfaces 100e, 100f of the body and gradually decreases to the edge of the wings 200, 300. The wings are preferable formed from a low friction material to minimize rodding resistance.

In one embodiment, the angle formed the first wing 200 and the first side surface 100e is between about 90 and 150 degrees. In another embodiment, the angle formed the second wing 300 and the second side surface 100f is between about 90 and 150 degrees. It has been found that this range of angles produces rodding assemblies having lower rodding resistance.

The rodding assembly also contains at least one spring loaded mechanism on the upper surface 100c of the body 100. The spring loaded mechanism may also be referred to as a spring or plunger. Preferably, the rodding assembly contains at least two spring loaded mechanisms on the upper surface 100c of the body 100, more preferably at least 4 spring loaded mechanisms along the upper surface 100c of the body 100. The spring loaded mechanisms may be formed on the body by any know means. The spring loaded mechanisms 400 may be attached to the upper surface 100c, may be recessed partially into the bulk of the body 100. In one embodiment, the spring loaded mechanisms 400 are attached to the upper surface 100c of the body 100 by creating small crevices in which the spring loaded mechanisms 400 partially reside and extend outward from the body 100 a suitable amount.

In one embodiment, each spring loaded mechanism 400 contains a body end and a conduit end, where the body end of the spring loaded mechanism 400 is attached to the body (on the surface or recesses into the body) and the conduit end of the spring loaded mechanism 400 contains a cap. This cap is typically the only part of the spring loaded mechanism 400 that is in contact with the inner wall of the conduit and is typically formed of a low friction material (such as TEFLON™). The spring loaded mechanisms minimize the amount of material in the rodding assembly 10 that is in contact with the inner wall of the conduit and thus helps to reduce the rodding resistance. The spring loaded mechanisms 400 may also serve to push down on the existing cables in a conduit to prevent them from getting wrapped around the cable rodding assembly and/or rod.

The spring loaded plungers are designed to keep the cables pushed to the bottom of the conduit while at the same time allowing the unit to raise or lower itself in confined sections. Other components such as spring steel could be used to give the same relief effect. The relief springs/mechanisms can vary in size depending on the conduit application. Larger units could me employed in situations where the conduit is larger.

Referring back to FIG. 5, the rodding assembly 10 also contains a rod mount 500 on the rear surface 100b of the body 10. The rod mount 500 is where the rod (not shown) is attached to the rod assembly 10 so that the rod assembly 10 can be pushed or rodded into a conduit. The rod mount 500 may be any suitable structure which allows the body 100 of the rodding assembly 10 to be attached to a rod. In one embodiment, the rod mount is a threaded (or not) cylinder (male adapter) in which a rod can be screwed onto (the rod containing the female adapter). In another embodiment, the rod mount 500 may be a recessed or carved out cylinder (threaded or not) (female adapter) in which a rod can be screwed into (the rod containing the male adapter). Preferably, the rod mount 500 is a threaded bolt. The bolt is preferably sized for the correct rodding threads. Other configurations such as quick connects could be used.

In some of the figures, a bolt may be seen on the front surface 100a of the body 100. This bolt is optional and may be used to help attach the rod mount 500 on the rear surface 100b of the body 100 and hold it securely. In some embodiments, the bolt is not on the front surface 100a (meaning that the front surface 100a contains no extra items) or a different attachment mechanism is in the bolt's place.

Referring now to FIG. 7, there is shown a cross-section of one embodiment of the rodding assembly 10 within a conduit 1000. The conduit has an inner wall 1000a and contains 3 cables 1100. While this conduit is shown with 3 cables (or wire or other elongated elements), the conduit can have no cables, one cable, two cables, three cables, or four or more cables already in the conduit 1000. The conduit may be any size, in one embodiment, the conduit size is between about 25 and 200 millimeters (inner diameter).

In this embodiment shown in FIG. 7, only the edges of the wings (200a, 300a) and the spring loaded mechanisms 400 are adjacent (in contact with or not) to the inner wall 1000a of the conduit 1000. A rod (not shown) is attached to the rod mount and serves to push the rodding assembly 10 into the conduit 1000.

The method of rodding a conduit using an embodiment of the rodding assembly 10, begins with placing the rodding assembly 10 at the opening of a conduit 1000 (with or without cables 1100 already installed in the conduit 1000). The rodding assembly is connected to a rod through the rod mount 500 and is inserted into the conduit such that the rodding assembly moves along the length of the conduit 1000. The rodding assembly 10 is oriented within the conduit 1000 such that the edges of the wings (200a, 300a) and the spring loaded mechanisms 400 are adjacent to the inner wall 1000a of the conduit 1000. If there are existing cables 1100 in the conduit, they are preferably located in the area of the conduit 1000 bounded by the inner surface of the conduit 1000a, the first wing 200, the lower surface of the body 100d, and the second wing 300. By preferably maintaining the cables 1100 in this designated area of the conduit 1000, the chance that the cables will be wrapped around the rod (which significantly increases the rodding pressure needed) is reduced. In one embodiment, the conduit 1000 contains curves.

In one embodiment, the method of rodding a conduit further contains the steps of detaching the cable rodding assembly from the rod and attaching a cable threading device to the rod and attaching a new cable (or other elongated element) to the cable threading device. Next the rod and threading device are moved in a direction opposite to the direction of insertion the rodding assembly threading the new cable through the conduit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of rodding a conduit comprising:

obtaining a conduit having an inner surface, a diameter, and a length, wherein the conduit at least one cable running along the length of the conduit;

obtaining a cable rodding assembly and a rod, wherein the cable rodding assembly comprises:

a body having a width, length, and height and having an upper surface, a lower surface, a first side surface, a second side surface, a front surface and a rear surface;

a first wing projecting outward from the first side surface of the body to a first edge and extending at least partially along the length of the body;

a second wing projecting outward from the second side surface of the body to a second edge and extending at least partially along the length of the body, wherein the body, the first wing, and the second wing are integral, formed from the same material at the same time, and are part of one whole, and wherein the first wing and second wing do not extend past the lower surface of the body;

at least one spring loaded mechanism attached to the upper surface of the body;

a rod mount on the rear surface of the body;

attaching the rod to the rod mount;

inserting the rodding assembly into the conduit such that the cable rodding assembly is located within the conduit and at least a portion of the rod is located within the conduit;

wherein the cable rodding assembly is oriented such that the spring loaded mechanism, the first edge of the first wing and the second edge of the second wing are adjacent the inner surface of the conduit and the cable is located in the area of the conduit bounded by the inner surface of the conduit, the first wing, the lower surface of the body, and the second wing;

detaching the cable rodding assembly from the rod and attaching a cable threading device to the rod; and, attaching a new cable to the cable threading device.

2. The method of claim 1, wherein the conduit comprises curves.

3. The method of claim 1, wherein inserting the rodding assembly moves the cable rodding assembly along the length of the conduit within the conduit.

4. The method of claim 1, wherein the angle formed by the first wing and the first side surface is between about 90 and 150 degrees and the angle formed by the second wing and the second side surface is between about 90 and 150 degrees.

5. The method of claim 1, further comprising moving the rod and the threading device in a direction opposite to the direction of insertion the rodding assembly threading the new cable through the conduit.

* * * * *